June 6, 1967 R. C. WHITEHEAD, JR 3,323,552
DEFLECTABLE TUBE
Filed Sept. 29, 1964
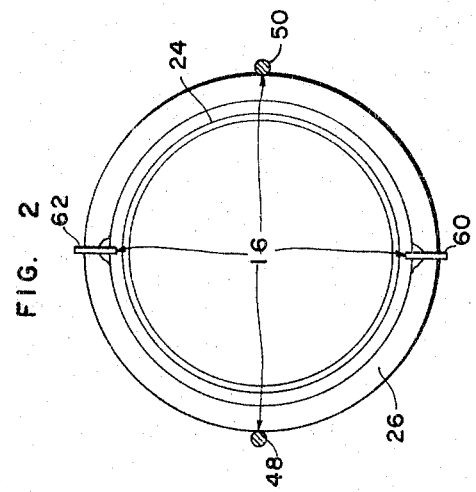
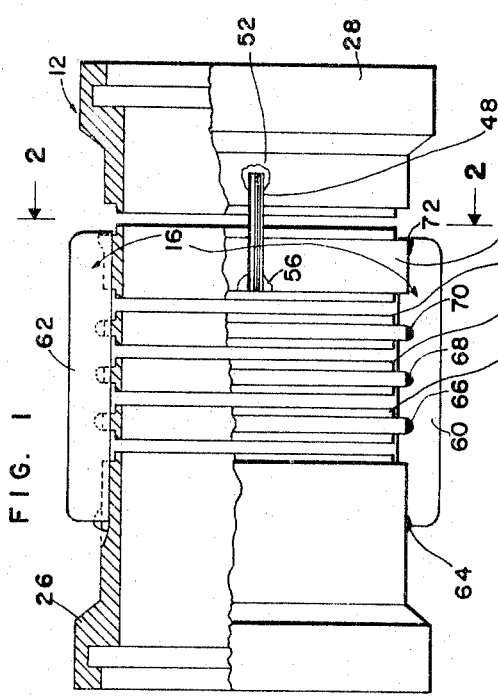
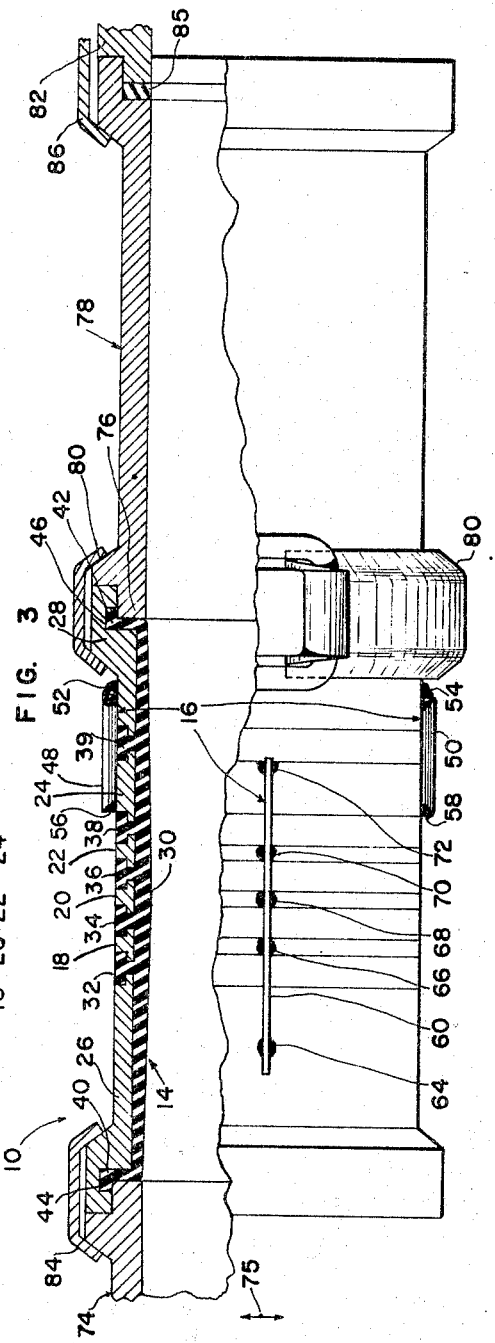
INVENTOR.
ROBERT C. WHITEHEAD Jr.
BY

United States Patent Office 3,323,552
Patented June 6, 1967

3,323,552
DEFLECTABLE TUBE
Robert C. Whitehead, Jr., Oreland, Pa., assignor to Honeywell Inc., a corporation of Delaware
Filed Sept. 29, 1964, Ser. No. 399,997
8 Claims. (Cl. 138—120)

It is an object of the present invention to provide a deflectable tube between two members to enable one of the members to be deflected relative to the other.

It is another object of the present invention to provide a deflectable tube that can readily be inserted as a passageway between a stationary and a deflectable flow pipe which tube will not be subject to rupture when a rapidly moving fluid under vacuum is passed therethrough.

More specifically, it is another object of the present invention to disclose a strong unitary deflectable tube for fluids under vacuum that is comprised of a resilient liner having annular rings of T-shaped cross-section protruding from its outer peripheral surface that are anchored in fixed sealed engagement with other annular rigid sleeve portions which are of an inverted T-shaped configuration.

It is still another object of the present invention to provide the outer peripheral surface of the aforementioned sleeve with two fixedly-connected, diametrically-opposed, rigid, thrust-retaining wires and two diametrically-opposed, fixedly-connected, flexible, thrust-retaining strips that are displaced ninety degrees from the wires and extend in an opposite longitudinal direction therefrom so as to prevent failure and/or extrusion of the resilient liner away from its anchored position when a thrust force is applied to the deflectable tube due to a pressure difference in the fluid inside and outside the deflectable tube.

It is still another object of the invention to disclose a resilient extruded liner for the aforementioned tube that is not only anchored in a vacuum sealed tight engagement to its metal sleeve portions by means of a dove tail joint, but is also provided with annular, inverted, L-shaped end portions that are in fixed sealing engament with an associated end of the metal portion of the sleeve and which can be clamped in vacuum sealed tight abutment with the stationary and deflectable flow pipe with which the ends of the sleeves are associated.

It is another specific object of the present invention to disclose a deflectable tube and pipe adapter which may be substituted for each of the braided resilient tubes that are used with the U-tube density measuring apparatus that is disclosed in the Whitehead Patent No. 3,151,775 when the fluid being measured is under a vacuum.

A better understanding of the present invention may be had from the following detailed description when read in connection with the accompanying drawings in which:

FIG. 1 is a plan view of the deflectable tube before the extruded resilient liner is made integral with its annular metal sleeve portions;

FIG. 2 is an end view taken off of line 2—2 of FIG. 1, and;

FIG. 3 is a side elevation of FIG. 1 and further shows the extruded liner and adapter that may be associated with the deflectable tube.

The deflectable tube 10 is comprised of a portion made of metal or hard plastic 12, a resilient extruded portion 14 and thrust retaining means 16 mounted on the metal portion 12 to prevent failure or extrusion of the resilient portion 14.

The metal or plastic parts are constructed of a plurality of annular inverted T-shaped rings 18, 20, 22, 24 and annular end portions 26, 28.

The resilient extruded portion 14 shown in FIG. 3 is constructed of a sleeve part 30 that is made of the tapered configuration shown and which contains annular rings 32, 34, 36, 38 and 39 that are extruded into position between the annular spaces formed between the annular inverted T-shaped rings 18, 20, 22 and 24. The right and left annular end portions 40, 42 are of an annular inverted L-shaped cross-section and are shown respectively in associated annular recesses 44, 46 formed in the end portions 26, 28 of the metal or hard plastic portion 12.

The thrust retaining means 16 is comprised of a pair of diametrically displaced wires 48, 50. The right ends of each of these respective wires 48, 50 are shown fixedly connected by a suitable welding material 52 and 54, and the left end of each of these wires is connected to the end portion 28 by similar connecting material 56, 58 to the outer surface of the inverted T-shaped member 24. The thrust retaining means is also comprised of a pair of diametrically-displaced flexible strips 60, 62. The flexible strip 60, for example, is shown connected by a suitable welding material 64, 66, 68, 70, 72 to the outer peripheral surfaces of the associated parts 24, 22, 20, 18, 26 of the metal or plastic portion 12. The other flexible strip 62 is also welded to the parts forming the metal or plastic portion 12 in the same manner as those described for the flexible strip 60.

It can be seen from the aforementioned description and by viewing of FIG. 3 of the drawing that the inner surface of the thrust retaining mans 16 is positioned immediately adjacent the outer annular peripheral surface of the T-shaped portions 32–39 to prevent failure and/or extrusion of the resilient member 14 which otherwise would have a tendency to occur when a rapidly flowing fluid under vacuum is passed through the deflectable tube 10 or when the fluid that is in the tube is at a pressure that is different from that of the atmospheric pressure.

FIG. 3 also shows the left inverted L-shaped end portion 40 in compressed, vacuum sealed tight engagement with a conduit 74. The conduit 74 could, by way of example, be the U-shaped member in the aforementioned Whitehead Patent No. 3,151,775. The horizontal longitudinal axis of the conduit 74 is thus moved in a vertical up-and-down direction as shown by the arrow 75 by the weight of the fluid under vacuum that is passing through a portion of a deflectable tube 10 and the tube 74.

The flexible strip 60, 62 provides the vertical flexibility that is necessary to enable the deflectable portion of the tube 10 to move in the aforementioned up-and-down direction.

The wires or rods 48, 50 also provide flexible adjustment at the right end of the flexible tube 10 to enable the tube 10 to be aligned with an adjacent non-lined flow tube portion against which the end of the flexible tube is to be brought into abutting clamped engagement.

The right inverted L-shaped end portion 42 is shown in a similar manner in compressed vacuum sealed tight engagement with the left end 76 of a stationary pipe adapter 78. The flexible tube 10 and the adapter 78 are retained in the vacuum sealed tight position by means of any suitbale commercially-available type of clamp 80. This clamped tube 10 and adapter 78 can thus be substituted for each of the flexible braided wire covered tubes that are disclosed in the aforementioned Whitehead Patent No. 3,151,775 when the fluid passing through the tube 78, 10 and 74 is under vacuum. This can be done by inserting the deflectable tube 10 and the adapter 78 in the space between the stationary conduit 82 and the tube 74 and employing commercially-available clamps 84, 86 to retain the ends 40, 42 of the resilient portion 14 in the aforementioned vacuum sealed position.

From the aforementioned description, it can be seen that a rupture-proof deflectable tube is disclosed for the first time that can readily be inserted in a pressurized or evacuated flow line and which is able to withstand the axial and radial forces that are applied to its internal surfaces by the fluid therein.

What is claimed is:

1. A deflectable tube adapted to be inserted as a part of a flow tube, comprising at least two rigid rings of inverted T-shaped cross-section spaced apart and between two rigid annular end portions, a first pair of diametrically-opposed thrust-retaining means connected to and extending between the outer peripheral surface of one of the annular end portions and the next adjacent ring associated therewith, a second pair of diametrically-opposed thrust-retaining means at right angles to the first means connected to and extending between the outer peripheral surface of the last-mentioned ring each of the other remaining rings and the other annular end portion, a resilient extruded sleeve portion having an outer surface thereof connected to the inner surfaces of the annular rings, annular end portions and annular portions of the T-shaped cross-section forming other outer surfaces of the sleeve that extends between and into sealed engagement with the annular side surfaces of the rings.

2. A deflectable tube through which a rapidly flowing fluid under vacuum is being transmitted adapted to be inserted as a part of a flow tube, comprising a plurality of spaced-apart rigid rings positioned between two rigid annular end portions, a first pair of diametrically-opposed thrust-retaining means connected to and extending between the outer peripheral surface of one of the annular end portions and the next adjacent ring associated therewith, a second pair of diametrically-opposed thrust-retaining means at right angles to the first means connected to and extending between the outer peripheral surface of the last-mentioned ring each of the other remaining rings and the other annular end portion, a resilient extruded sleeve portion having an outer surface thereof connected to the inner surfaces of the annular rings, annular end portions and annular portions forming other outer surfaces of the sleeve that extends between and into mechanically sealed engagement with the annular side surfaces of the rings.

3. A deflectable tube through which a rapidly flowing fluid under vacuum is being transmitted adapted to be inserted as a part of a flow tube, comprising a plurality of spaced-apart rigid rings positioned between two rigid annular end portions, a first pair of diametrically-opposed thrust-retaining means connected to and extending between one of the annular end portions and the next adjacent ring associated therewith, a second pair of diametrically-opposed thrust-retaining means displaced from the first means, connected to and extending between the last-mentioned ring each of the other remaining rings and the other annular end portion, a resilient sleeve having an outer surface thereof connected to the inner surfaces of the annular rings, annular end portions, and annular portions forming other outer surfaces of the sleeve that extends between and into mechanically sealed engagement with the rings.

4. The deflectable tube as defined by claim 3, wherein the parts of the resilient sleeve connected to the annular end portions are of an L-shaped cross-section, the annular vertical leg of which provides a surface against which other adjacent portions of the flow tube can be abutted into vacuum sealing engagement.

5. The deflectable tube as defined in claim 3, wherein resilient sleeve portions formed within the annular ring and annular end portions are of a gradual increasing thickness along its longitudinal axis between its central and elongated end portions.

6. The deflectable tube as defined in claim 3, wherein the first pair of thrust-retaining means is constructed of a rod-shaped configuration to enable the end of the flexible tube to be flexed into alignment with a non-aligned end of an associated flow tube portion whose longitudinal axis is out of alignment with the longitudinal axis of the flexible tube.

7. The deflectable tube as defined in claim 3, wherein the second pair of thrust-retaining means is of a flexible strip plate construction to enable the longitudinal axis of the end of the deflectable tube with which the strips are associated to be moved in a plane substantially perpendicular to the plane of the strips.

8. A deflectable tube for a flowing fluid adapted to be inserted as a part of a flow tube, comprising a plurality of spaced-apart rigid rings positioned between two rigid annular end portions, a first pair of diametrically-opposed thrust-retaining means connected to and extending between one of the annular end portions and the next adjacent ring associated therewith, a second pair of diametrically-opposed thrust-retaining means displaced from the first means, connected to and extending between the last-mentioned ring each of the other remaining rings and the other annular end portion, a resilient cylindrical member having an outer surface thereof connected to the inner surfaces of the annular rings, annular end portions, and annular portions forming other outer surfaces of the sleeve that extends between and into sealed engagement with the rings.

References Cited

UNITED STATES PATENTS

| 2,886,066 | 5/1959 | Hansen | 285—114 |
| 3,006,662 | 10/1961 | Katsuhara | 285—114 |
| 3,170,720 | 2/1965 | Browning | 285—114 |

LAVERNE D. GEIGER, *Primary Examiner.*

C. L. HOUCK, *Assistant Examiner.*